United States Patent [19]
Darovic

[11] Patent Number: 6,098,688
[45] Date of Patent: Aug. 8, 2000

[54] DEVICE FOR IMPROVING AN EDGEBANDING MACHINE

[76] Inventor: Brian Darovic, 2257 N. Magnolia, Chicago, Ill. 60614

[21] Appl. No.: 07/793,824

[22] Filed: Nov. 18, 1991

[51] Int. Cl.[7] .................................................... B32B 31/00
[52] U.S. Cl. ........................... 156/510; 156/577; 156/499
[58] Field of Search ...................................... 156/510, 577, 156/499; 409/89, 98, 108, 128, 124, 127; 83/361, 365, 373, 401

[56] References Cited

U.S. PATENT DOCUMENTS

| | | | |
|---|---|---|---|
| 3,649,417 | 3/1972 | Izen et al. | 156/446 |
| 3,863,543 | 2/1975 | Bottcher et al. | 409/86 |
| 4,142,444 | 3/1979 | Draper | 90/15 R |
| 4,260,001 | 4/1981 | De Muynck | 144/144 A |
| 4,317,644 | 3/1982 | Hosoi | 409/98 |
| 4,593,735 | 6/1986 | Wirth, Jr. | 144/144 R |
| 4,733,997 | 3/1988 | Ford et al. | 409/84 |
| 4,909,292 | 3/1990 | Wirth, Jr. | 144/144 R |
| 4,991,637 | 2/1991 | Butler | 144/142 |
| 5,003,729 | 4/1991 | Sherby | 83/53 |

*Primary Examiner*—Merrick Dixon
*Attorney, Agent, or Firm*—Patula & Associates, P.C.

[57] ABSTRACT

The invention is a device for trimming excess material from adjacent surfaces of a workpiece, consisting of a horizontal planar surface for supporting a workpiece, with the horizontal planar surface having front and back ends. Attached to the horizontal planar surface is a vertical support, having a tracing assembly support disposed thereon. Supported by the tracing assembly is a cutter for cutting the excess material applied to a edge of a workpiece, the cutter supported and guided by the tracing assembly as the workpiece is moved from the front end toward the back end of the horizontal planar surface.

21 Claims, 19 Drawing Sheets

DEVICE FOR IMPROVING AN EDGEBANDING MACHINE

This device relates to an improved edgebanding machine, specifically, a method of trimming an edgeband from a workpiece.

BACKGROUND OF THE INVENTION

It has always been a woodworking problem to quickly and conveniently apply then trim the excess material applied to the surface or edge of a wood or particle board. The covering, referred to in the trade an "edgeband", is typically glued or otherwise applied to the sides of a board prepared for use as a cabinet top, door, drawer front, shelf, or the front of a cabinet part. After the edgeband is applied to the edge of the board, usually with glue, a method must be devised to trim flush that part of the edgeband that overhangs the edges. The invention quickly and efficiently solves the problem of trimming excess or overhanging edgeband by employing a rotating cutter that is maintained in precisely the correct position to the cutting surface through the use of a tracing assembly.

The prior art in the field teaches various methods of applying the edgeband to the board, but none teach a means for trimming the edgeband flush with the workpiece board. For example, U.S. Pat. No. 3,649,417 to Izen, et al, U.S. Pat. No. 3,676,272 to White, et al, U.S. Pat. No. 3,753,832 to Veneziale, Jr., U.S. Pat. No. 4,067,762 to Rhoads, U.S. Pat. No. 4,222,812 to Duewel, and U.S. Pat. No. 4,849,063 to McXinnon. No known patents perform the function of trimming the edgeband off a workpiece in such a simple, efficient and economical manner.

BRIEF SUMMARY OF THE INVENTION

An edgebanding machine is a woodworking machine that applies an edge material to the edge of a board which will eventually be used on a table, countertop, door, drawer front or part of a cabinet. The present invention trims the excess edging material so that it is flush with the top, bottom, front and back of the workpiece board.

The present invention uses a rotary cutter in combination with a unique tracing device that uses two adjustable rods that determine the depth of the cutter in two different planes. These adjustable rods are independently adjusted so the same cutter can be used for cutting the front edge and the top edge of a workpiece. The rear and bottom edges can be trimmed by turning the workpiece over and passing the workpiece through the machine again. The cutter and tracing device are mounted on a vertically supported plate that slides at an angle to the workpiece.

At the start of the operation, the workpiece is laid on the horizontal table or other planar surface, with the edgeband to be trimmed oriented to eventually pass under the rotating cutter. The operator or some mechanism pushes the workpiece forward until the front face of the workpiece abuts the cutter and tracer. With further forward movement of the workpiece, the cutter and tracer are forced up the face of the front surface of the workpiece. The tracer and the cutter of the present invention continue up the face until it reaches the top surface of the workpiece where the tracer stops rising and rolls over the edge to the top surface of the workpiece. There is a roller incorporated in the design so the device can change from cutting the front surface to cutting the top surface without damaging the right angled corner edge.

After the cutter and tracer have traversed the top surface of the workpiece to the rear edge of the workpiece, the cutter and tracer unit slide downward because of gravity toward the horizontal planar surface to their starting position.

The present invention also differs from existing known edgebanding machines by permitting one motor to do the work of two motors. By using one motor to trim the top and front edges of a workpiece sequentially, a less expensive and more energy efficient overall machine can be built. The invention is novel because it uses one motor and one tracing device with two independently adjustable tracers so the same unit can trim the edges of two adjacent sides, and the depth of the cutter can be adjusted independently for each side, and the corner between the front face and the top surface will not be rounded during this operation.

It is the principle object of this invention to provide a means for improving an edgebanding machine.

It is a further object of this invention to provide a more mechanically efficient method of trimming the excess material on a workpiece.

It is also an object of this invention to provide a more energy efficient means for trimming the edgeband on a workpiece.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DESCRIPTION OF THE PREFERRED EMBODIMENT OF THE INVENTION

Figure 1:
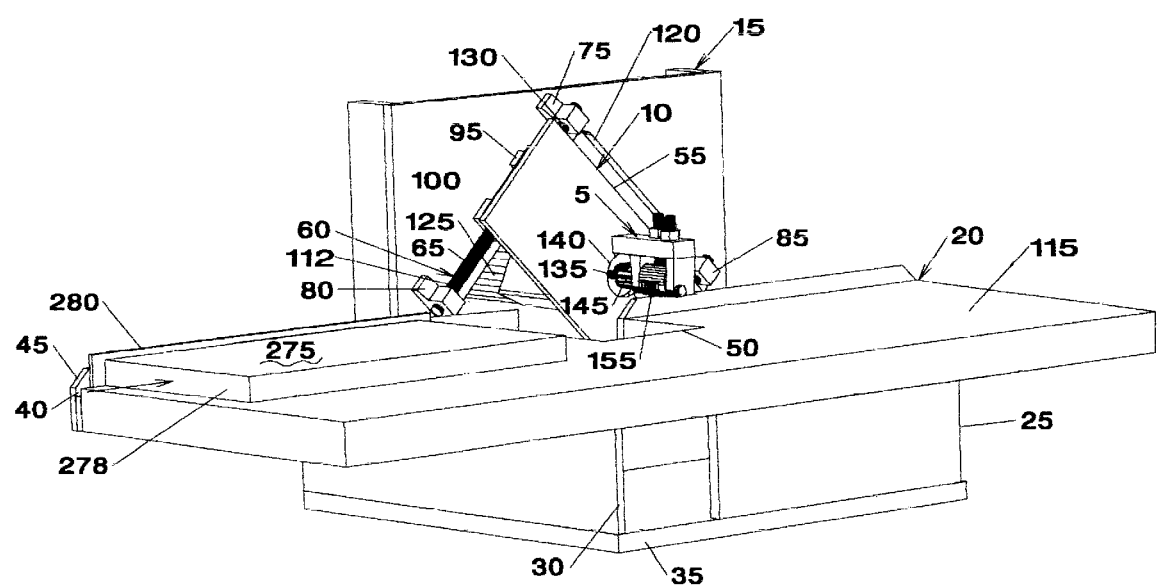
FIG. 1 is a perspective view of the preferred embodiment of the present invention.

While the invention is susceptible of embodiment in many different forms there is shown in the drawings and will be described herein in detail, preferred and alternate embodiments of the invention. It should be understood, however, that the present disclosure is to be considered an exemplification of the principles of the invention and is not intended to limit the spirit and scope of the invention and/or claims of the embodiments illustrated.

Figure 2:
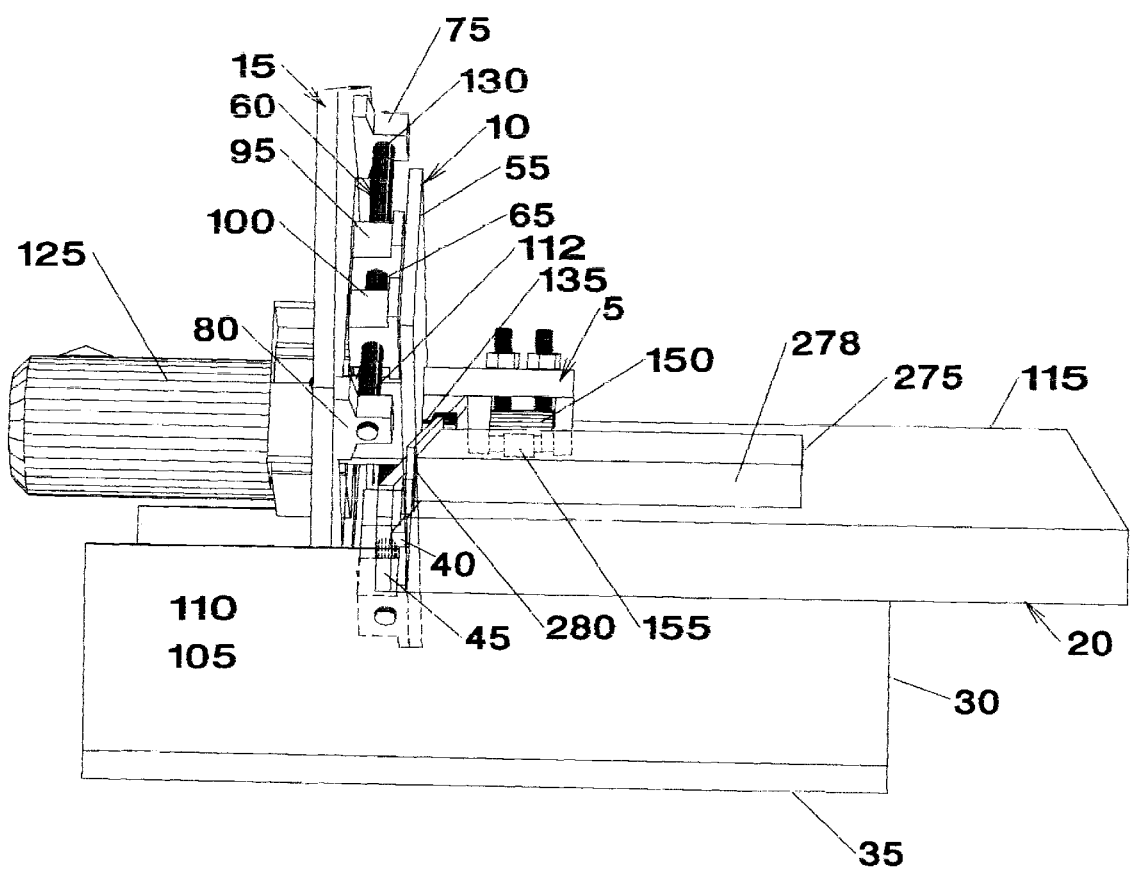
FIG. 2 is a side view of the preferred embodiment of the present invention, showing the cutter and tracing assembly positioned at the front face of a workpiece.

Referring now to the drawings, FIGS. 1 and 2 show the preferred embodiment of the completed, improved edgebanding device 1, consisting of the complete tracing assembly 5, a tracing assembly support 10, vertical support 15, and horizontal table 20. On horizontal table 20 is workpiece 275, having edgeband 280 and rear edge 278.

Horizontal table 20 is supported by legs 25 and 30 standing on table base 35. One side of horizontal table 20 has a trough 40 extending the full length of the horizontal table 20. Attached to the side of the horizontal table 20 with the trough 40 is a shoulder 45 which also extends for the length of the horizontal table 20. The horizontal table 20 has material removed from it to define a tracer cavity 50, of sufficient size to accommodate the complete tracing assembly 5.

FIGS. 1 and 2 also show the complete tracing assembly 5 attached to plate 55, in turn attached to sliding support 60. The support consists of parallel bars 65 and 70 (not shown) (see also FIG. 15) oriented at an angle. It may be desired, but not limited thereto, to use a 45 degree angle to the plane defined by the horizontal table 20. The bars 65 and 70 are securely attached to bar supports 75 and 80, and bar supports 85 and another (not shown), which are securely attached to vertical support 15. The vertical support 15 is attached perpendicularly to the table base 35. The plate 55 is movably attached to the parallel bars 65 and 70 (not shown) by means of a bore through plate supports 95 and 100 and plate supports 105 and 110 so that the plate 55 and attached tracing assembly support 10 can slide freely along the length of the parallel bars 65 and 70 (not shown). The tracing assembly support 10 is then disposed on the vertical support 15 so that the tracing assembly support 10 is allowed by the force of gravity to rest at the bottom of the sliding support 60 at point 112. A portion of the complete tracing assembly 5 nests in tracer cavity 50, so that the bottom of the complete tracing assembly 5 rests below the upper surface 115 of the horizontal table 20.

Also attached to plate 55 is a cutter rotation assembly 125, the cutter rotation assembly 125 protruding through a vertical support cavity 120 in the vertical support 15. The vertical support cavity 120 is sized to accommodate the cutter rotation assembly 125 through the complete movement of the sliding support 60 from the point where the plate 55 rests at the bottom point 112 of the parallel bars 65 and 70 (not shown) to the point where the plate 55 is moved to the top of the parallel bars 65 and 70 at top point 130. The cutter rotation assembly 125 has a shaft 135, extending through a hole 140 in the plate 55. Affixed to the end of the shaft 135 is a cutter 145 so designed that when the cutter rotation assembly 125 turns at a rapid rate, the cutter 145 can trim the excess material from a variety of materials such as plastic, metal, linoleum, or wood.

Figure 3:
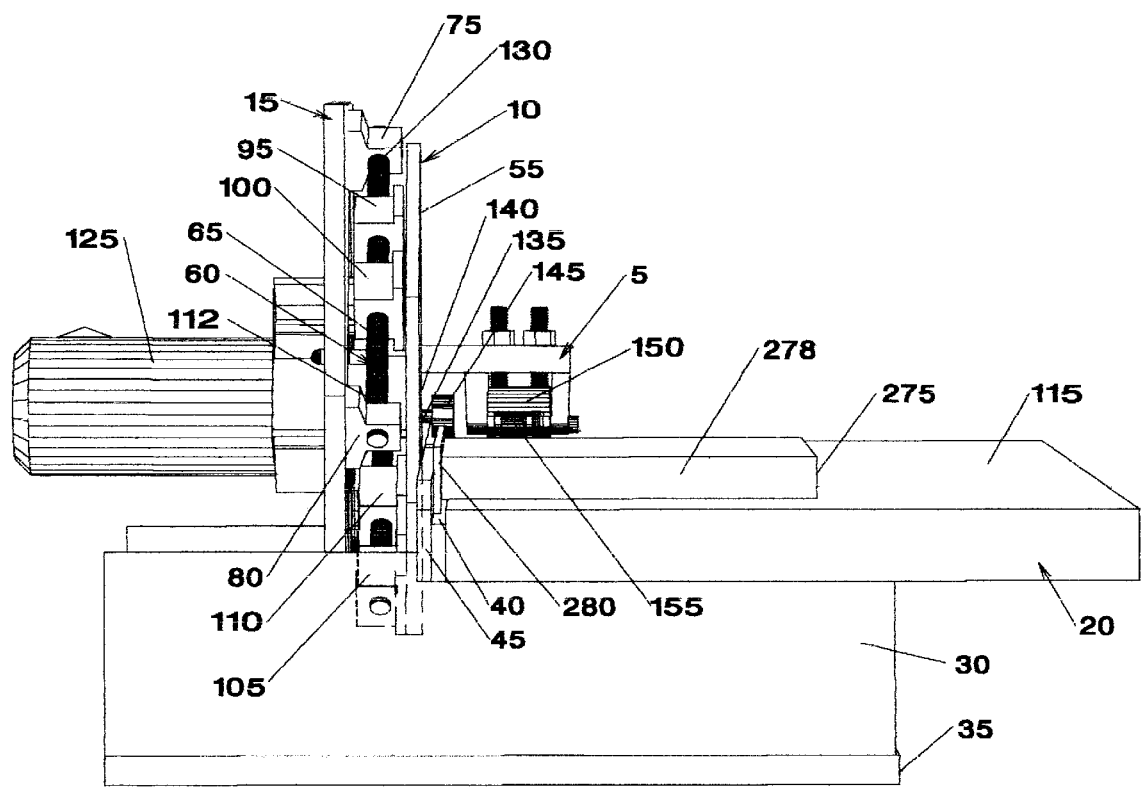
FIG. 3 is a side view of the preferred embodiment of the present invention, the cutter and tracing assembly positioned on the top surface of a workpiece.

FIG. 3 shows the invention as described above for FIGS. 1 and 2, but after workpiece 275 has been passed through the present invention 1 and the cutter 145 has trimmed the edgeband 280.

Figure 4:
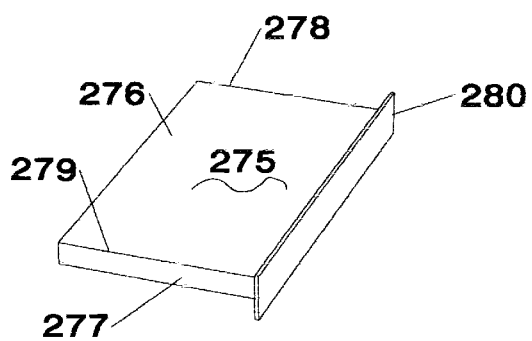
FIG. 4 is a perspective view of a typical workpiece having excess edgeband.
Figure 5:
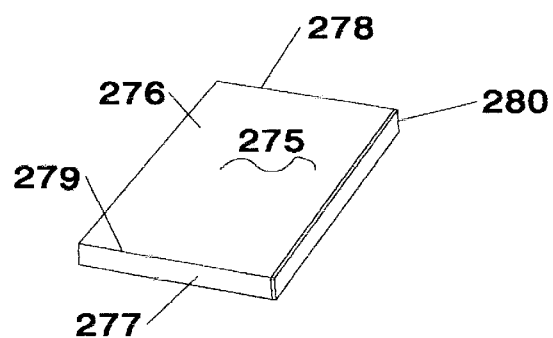
FIG. 5 is a perspective view of a workpiece after the excess edgeband was trimmed by the present invention.

FIG. 4 depicts the workpiece 275 with excess edgeband 280, and FIG. 5 shows workpiece 275 after the workpiece 275 has been passed through the present invention 1. Workpiece 275 has a top surface 276, a front face 277 a rear face 278, and a corner 279 between top surface 276 and front face 277.

Figure 6:
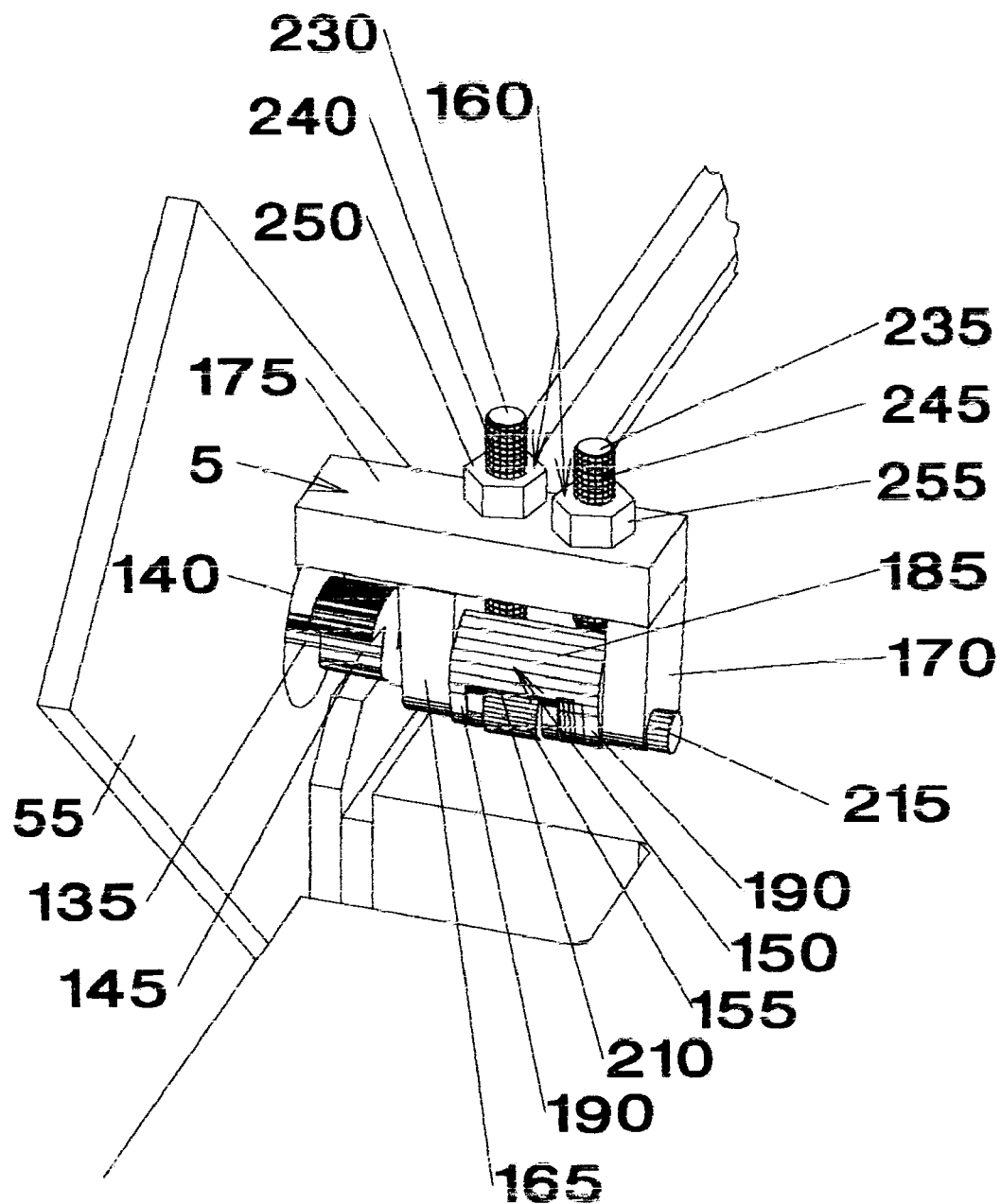
FIG. 6 is a detailed perspective view of the tracing assembly and cutter of the preferred embodiment of the present invention.

FIG. 6 depicts the complete tracing assembly 5 in detail, having a tracer subassembly 150, a roller 155, rod 215, cavity 210, and a tracing adjustment assembly 160 having rods 230 and 235, having threads 240 and 245, and locknuts 250 and 255. The tracer subassembly 150, having upright member 185 and horizontal member 190, is supported by sidewalls 165 and 170, which are fastened at right angles to assembly support 175. The assembly support 175 is attached perpendicularly to plate 55. Protruding through plate 55 is cutter 145 on shaft 135 through cavity 140.

Figure 7:
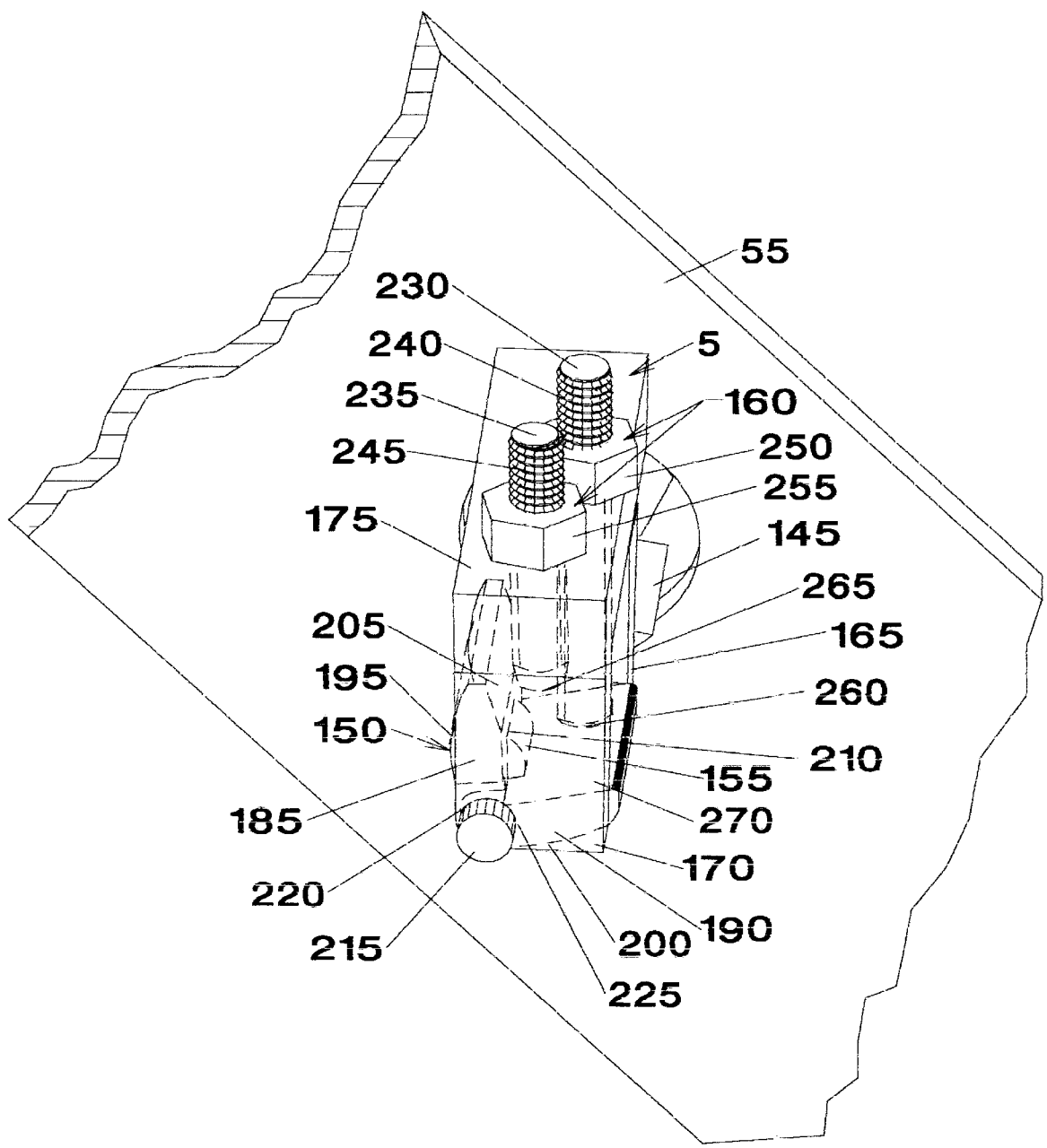
FIG. 7 is a reverse angle detailed perspective view of the tracing assembly and cutter of the preferred embodiment of the present invention.

In the preferred embodiment shown in FIG. 7, the tracer subassembly 150 is a two piece apparatus consisting of an upright member 185 and a horizontal member 190, so that when fitted together, the pieces have a predominately L-shaped configuration. The surfaces on the outside of the L, 195 and 200 are rounded, while the inside surface 205 of the upright member 185 is beveled at an angle pointing towards the top of the L. The upright member 185 and horizontal member 190 have excess material removed from them to form a cavity 210 so as to accommodate a roller 155. The roller 155 and tracer subassembly 150 are fastened to the sidewalls 165 and 170 with a rod 215, which coaxially pierces hole 220 in sidewall 170, though a bore 225 on one side of the horizontal member 190, through the bore 225 in the upright member 185, and continues through a coaxial bore (not shown) in roller 155, through bores on the opposite side of the upright member 185 and horizontal member 190 (not shown) and into a bore (not shown) on sidewall 165. The rod 215 serves as an axle upon which roller 155 can rotate and on which upright member 185 and horizontal member 190 can pivot.

The tracer subassembly 150 is secured into position with tracing adjustment assembly 160. The tracing adjustment assembly 160 consists of two extensible rods 230 and 235 extending through threaded bores in assembly support 175. The rods have threads 240 and 245 so that when rods 230 and 235 are turned, the distance between the end of the rods 260 and 265 and the assembly support 175 can be varied. The end 265 of rod 235 is positioned so that it makes contact with the beveled portion 205 of the upright member 185, whereas the end 260 of rod 230 is positioned to make contact with the top surface 270 of the horizontal member 190. Locknuts 250 and 255 lock rods 230 and 235 in place.

Increasing or decreasing the distance between the end of rod 230 or 235 and the assembly support 175 attached to plate 55 by turning rod 230 or 235 alters the orientation of the tracer subassembly 150. Adjusting rod 235 moves the upright member 185 forward or backward, and adjusting rod 230 moves the horizontal member 190 up or down.

Figure 15:
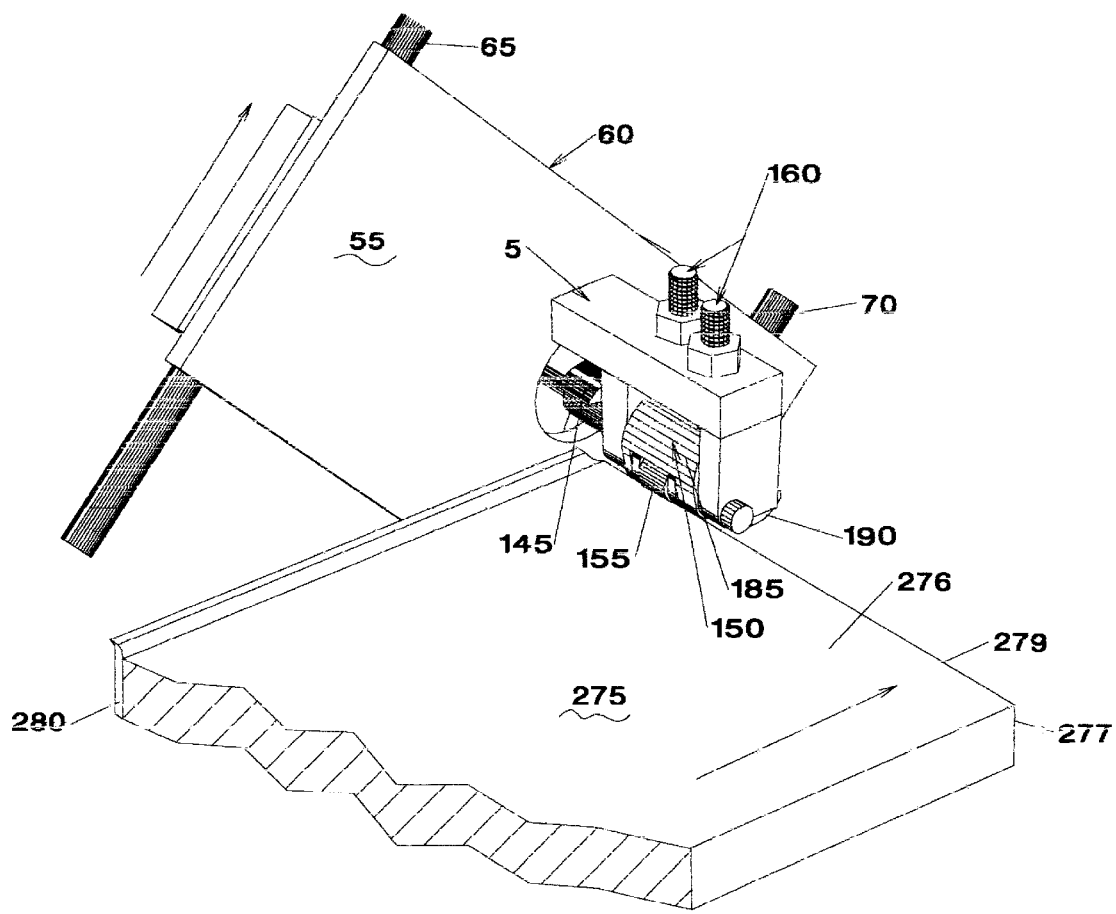
FIG. 15 is a simplified perspective view of the workpiece in contact with the tracing assembly of the preferred embodiment of the present invention at the corner between the front face and the top surface of the workpiece.

Because the complete tracing assembly 5 and cutter 145 are aligned as shown in FIG. 15, the adjusting process ultimately regulates where the cutter 145 trims the edgeband 280 on work piece 275. Adjusting the upright member 185 determines how much of the edgeband 280 extending from the front surface 277 of the workpiece 275 the cutter 145 will trim. Likewise, adjusting the horizontal member 190 determines how much of the edgeband 280 extending past the top surface of the workpiece 275 will be trimmed. In this manner, the cutter 145 can be adjusted to trim the edgeband flush with the workpiece 275.

Figure 8:
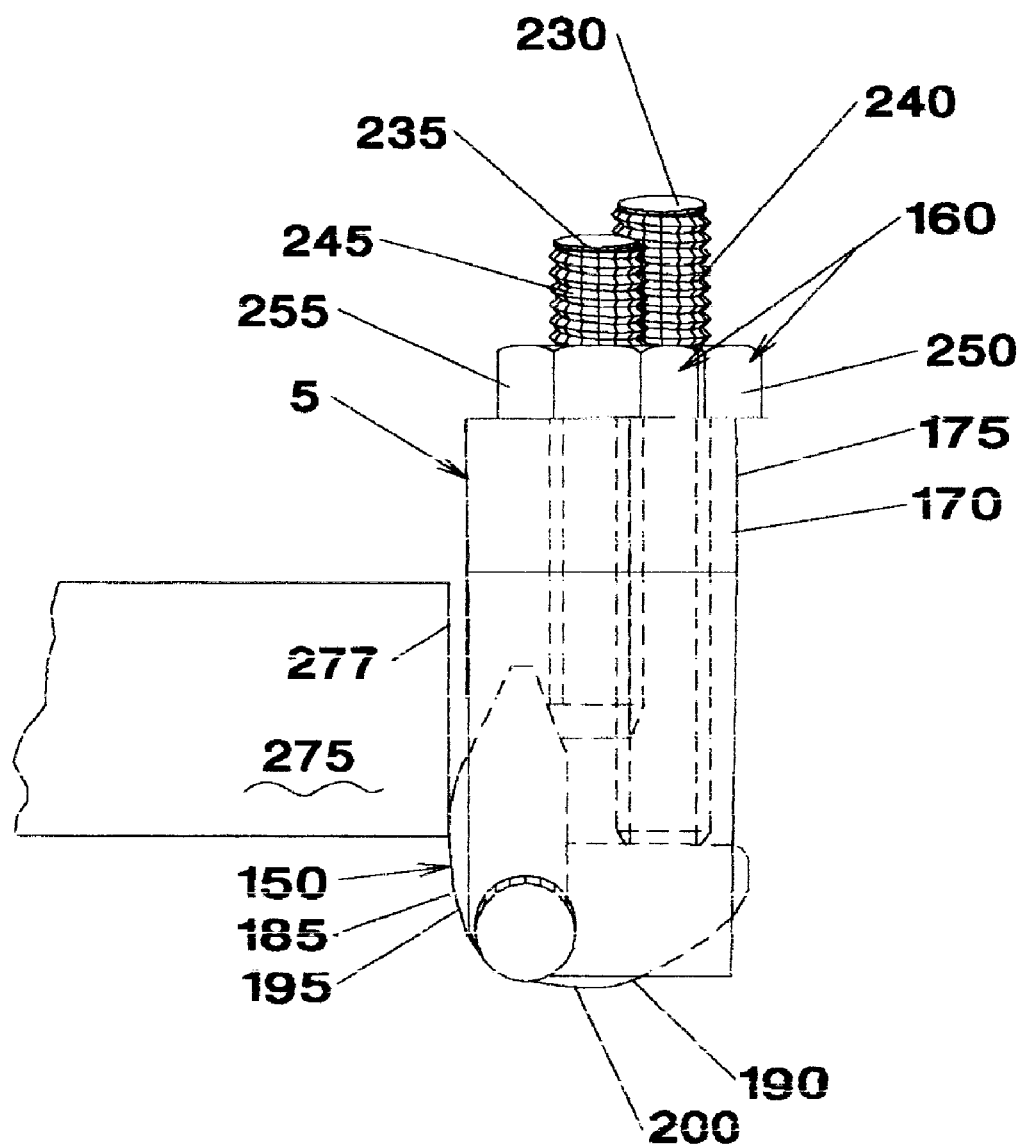
FIG. 8 is a side view of the tracer assembly of the preferred embodiment of the present invention at first contact with the front surface of a workpiece.
Figure 9:
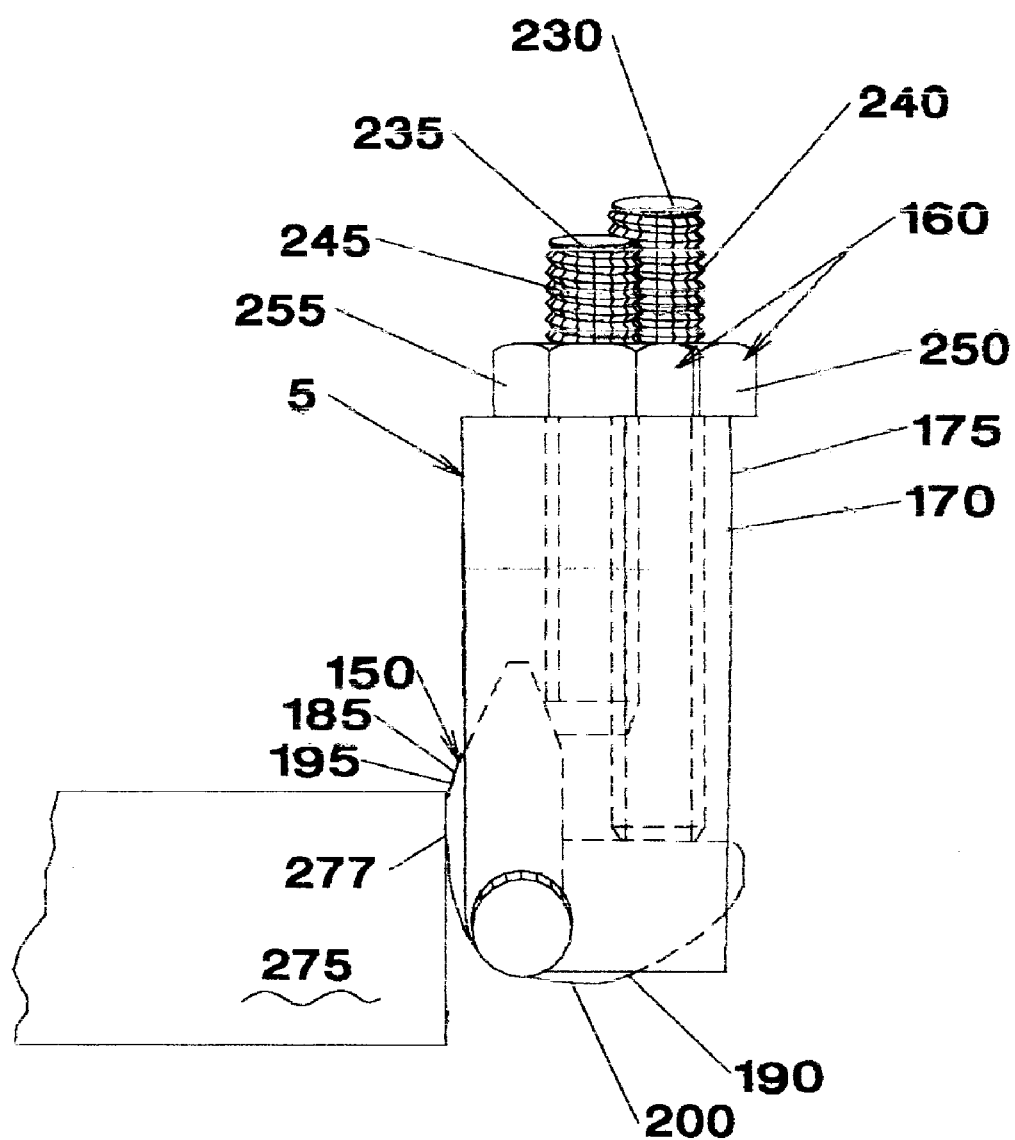
FIG. 9 is a side view of the tracer assembly of the preferred embodiment of the present invention moving up the front surface of a workpiece.
Figure 10:
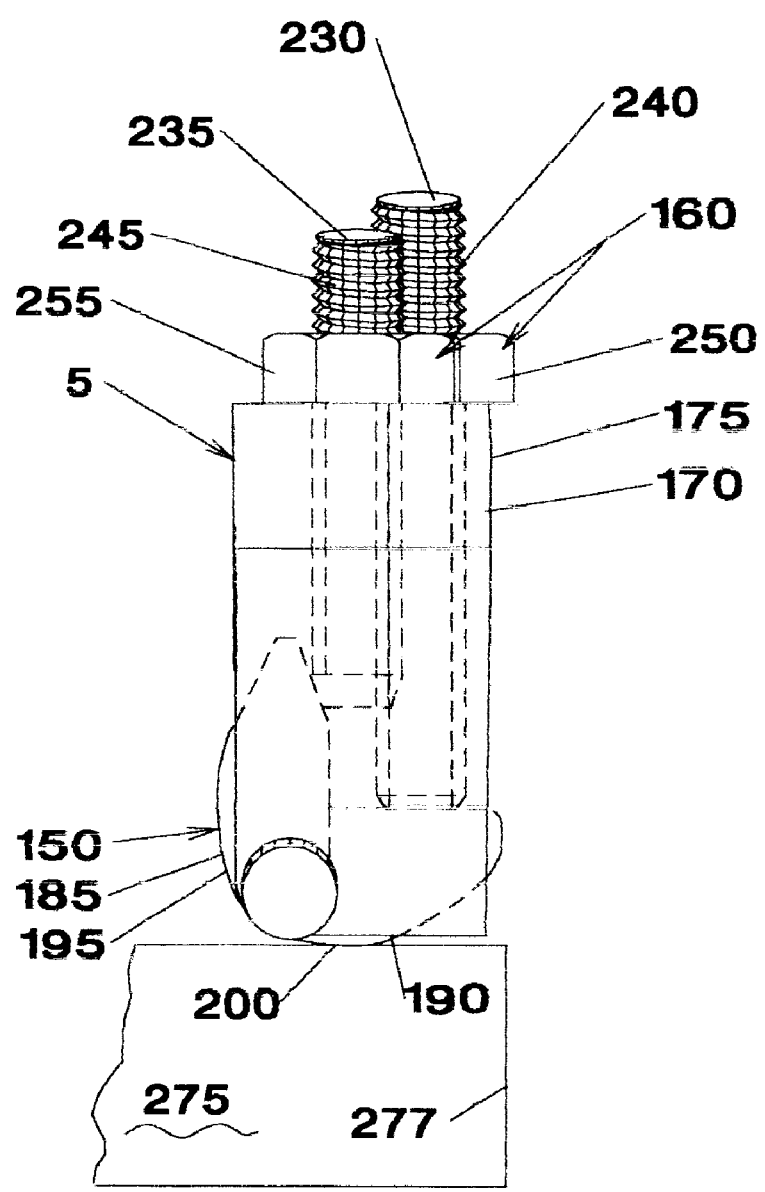
FIG. 10 is a side view of the tracer assembly of the preferred embodiment of the present invention on the top surface of the workpiece.

FIGS. 8, 9, and 10 show the position of the complete tracing assembly 5 in relation to the workpiece 275 as the workpiece 275 is pushed through the invention 1 by the operator or by some mechanism. Complete tracing assembly 5 has assembly support 175, sidewall 170, tracer adjustment assembly 160, having rods 230 and 235, rod threads 240 and 245, and locknuts 250 and 255, tracer subassembly 150, having upright member 185 with outside surface 195 and horizontal member 190 with outside surface 200.

FIG. 8 shows complete tracing assembly 5 in contact with the front face 277 of workpiece 275. FIG. 9 depicts the complete tracing assembly 5 as it begins its assent up the front face 277 of workpiece 275. FIG. 10 shows the complete tracing assembly 5 on the top surface 276 of the workpiece 275.

Figure 11:
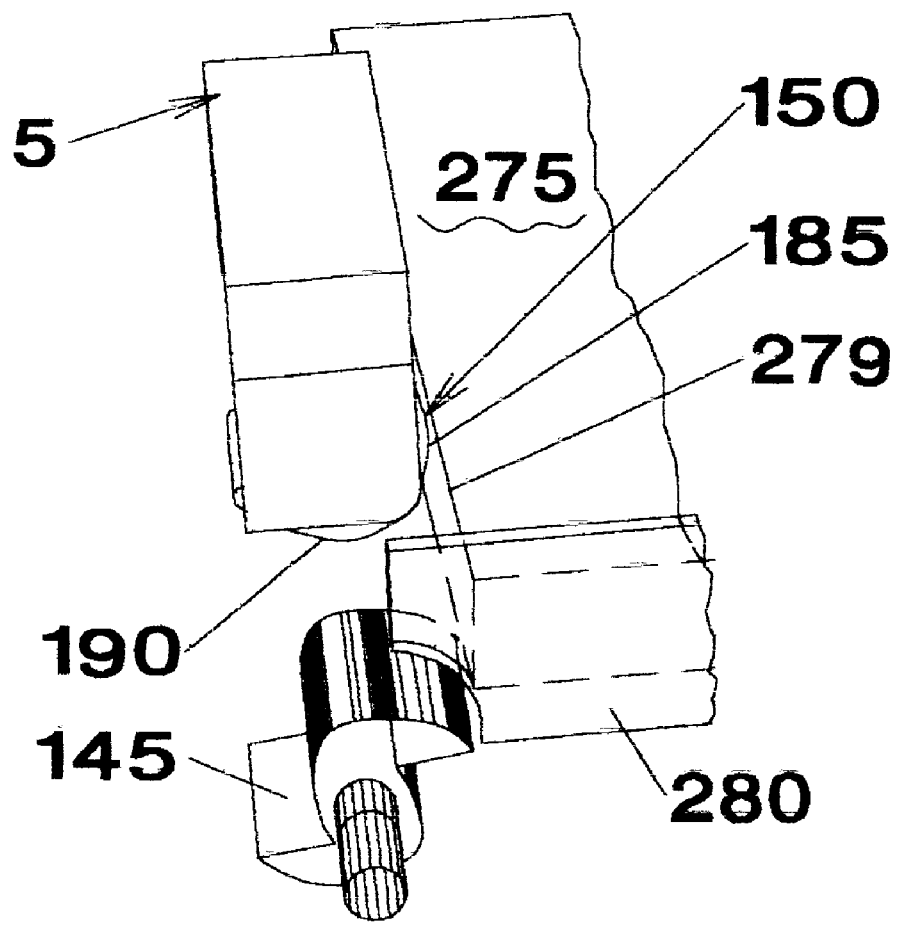
FIG. 11 is a simplified perspective view of the tracer assembly of the preferred embodiment of the present invention coming into contact with the front surface of a workpiece and the cutter coming into contact with the edgeband.
Figure 12:
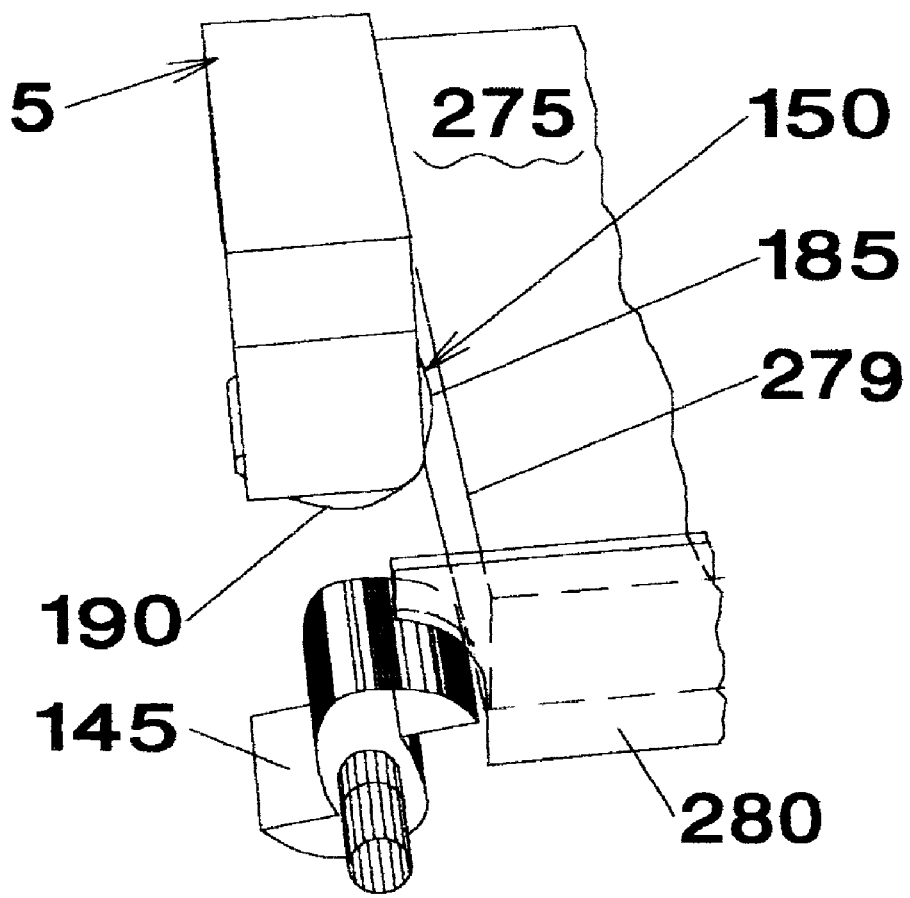
FIG. 12 is a simplified perspective view of the tracer assembly of the preferred embodiment of the present invention part-way up the front surface of the workpiece and the cutter trimming the edgeband.
Figure 13:
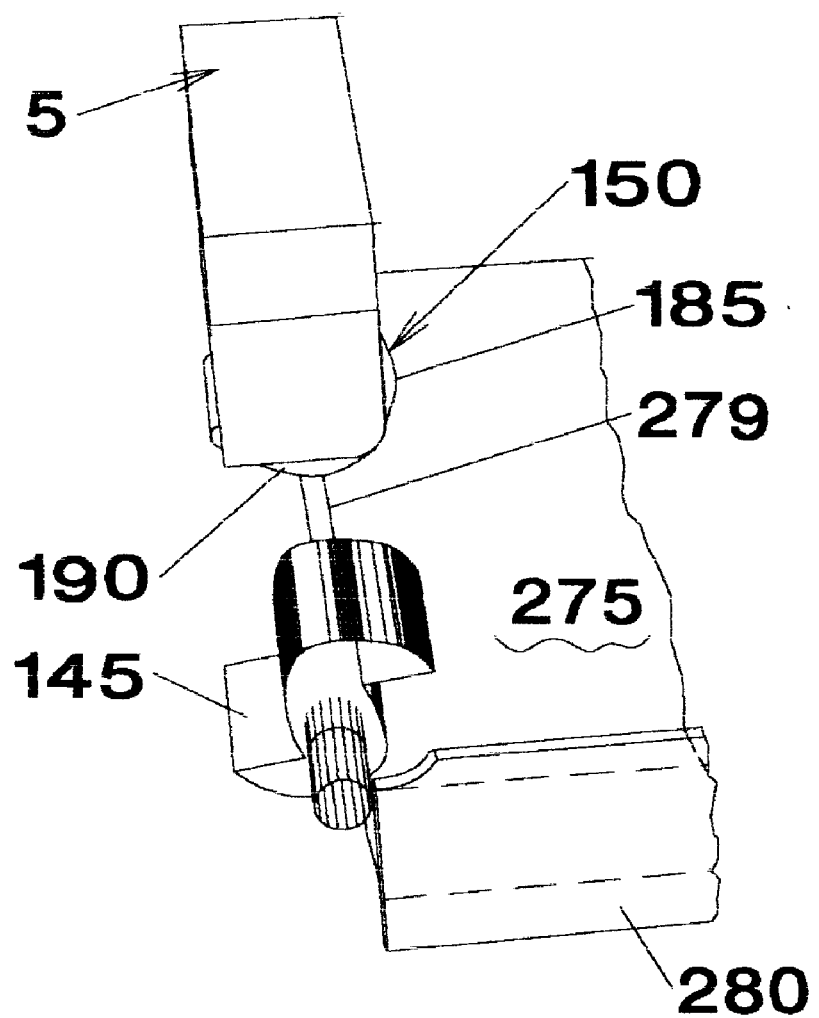
FIG. 13 is a simplified perspective view of the tracer assembly of the preferred embodiment of the present invention at the corner between the front face and the top surface of the workpiece and the cutter clearing the edgeband.
Figure 14:
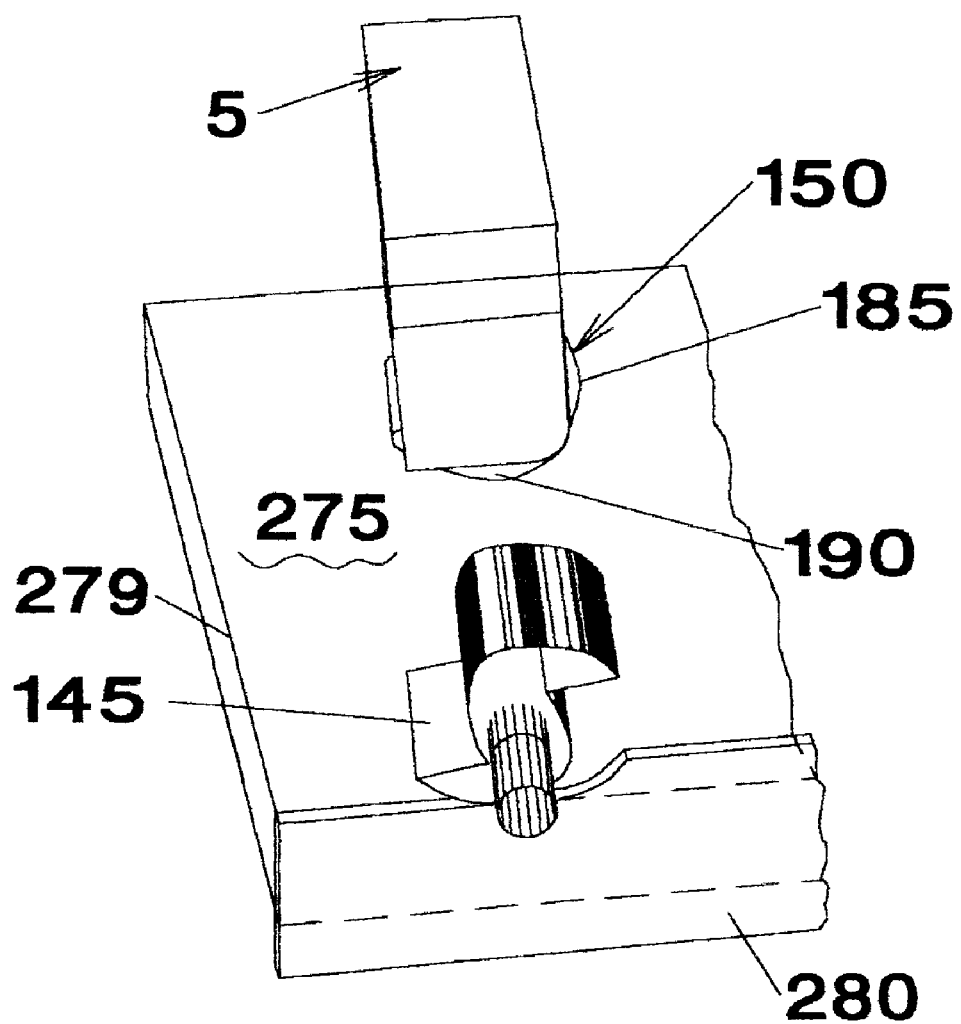
FIG. 14 is a simplified perspective view of the tracer assembly of the preferred embodiment of the present invention on the top surface of the workpiece and the cutter trimming the edgeband.

FIGS. 11, 12, 13 and 14, show from a reverse angle the movement of the complete tracing assembly 5, having tracer subassembly 150 with upright member 185 and horizontal member 190, and cutter 145 as the workpiece 275 with edgeband 280 is moved through the preferred embodiment. FIG. 11 shows the complete tracing assembly 5 and the cutter 145 moving up front face 277 of workpiece 275 having edgeband 280. FIG. 12 shows the complete tracing assembly 5 and cutter 145 moving up front face 277 of workpiece 275. FIG. 13 shows the complete tracing assembly 5 and cutter 145 on the corner 279 between top surface 276 and front face 277 of workpiece 275. FIG. 14 shows complete tracing assembly 5 and cutter 145 on top surface 276 of workpiece 275.

FIG. 15 shows a simplified view of the preferred embodiment of invention 1, the upward movement of sliding support 60 on parallel bars 65 and 70 as complete tracing assembly 5 attached to plate 55 and cutter 145 travel over the corner 279 between top surface 276 and front face 277 of workpiece 275 having edgeband 280. Complete tracing assembly 5 has tracer subassembly 150 consisting of upright member 185 and horizontal member 190 and roller 155. Tracing assembly also has tracer adjustment assembly 160.

Figure 18:
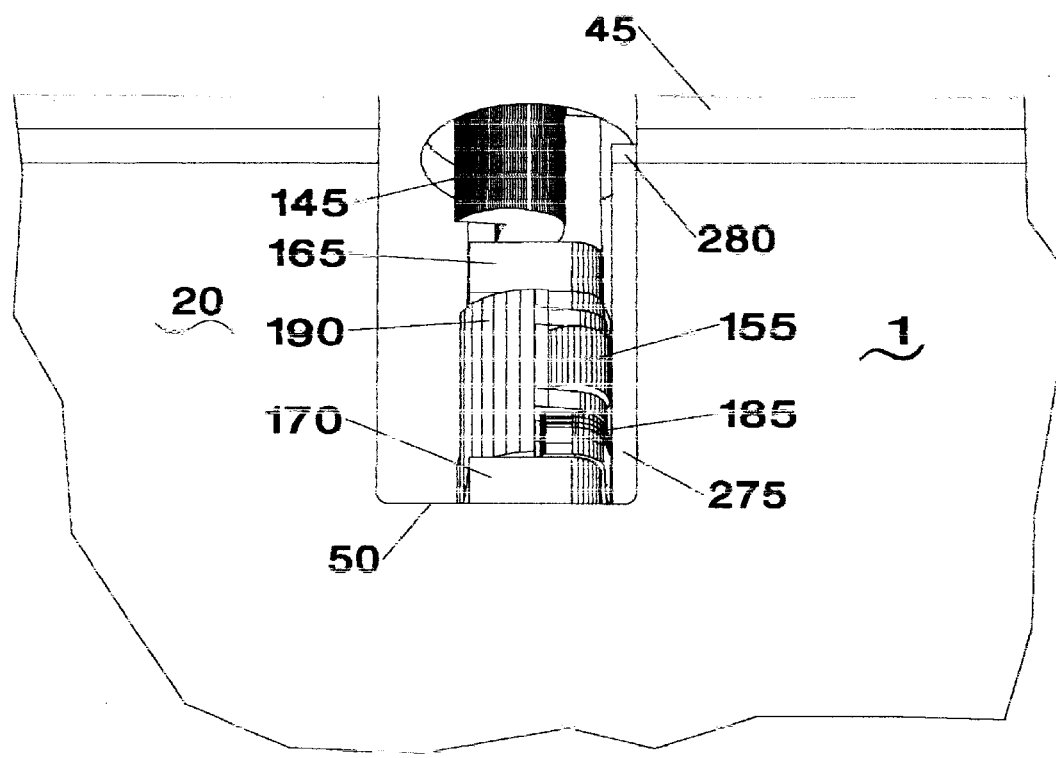
FIG. 18 shows a bottom view of the preferred embodiment of the present invention.

FIG. 18 shows a bottom view of the preferred embodiment of invention 1 with roller 155, horizontal member 190, upright member 185 and sidewalls 165 and 170. Cutter 145, cavity 50, shoulder 45, and the underside of horizontal table 20 are also shown, as is workpiece 275 with edgeband 280.

The operation of the present invention is simply and effectively described as follows: a workpiece 275 with edgeband 280 as shown in FIG. 4 is placed on the upper surface 115 of horizontal table 20, so that the edgeband 280 is in trough 40 and abuts against shoulder 45, as shown in FIGS. 1, 2, and 3. The cutter rotation assembly 125 is activated so that cutter 145 begins spinning at a rapid rate. The operator or some mechanism exerts forward pressure on the workpiece 275 until the front face 277 (see FIGS. 11, 12, and 13) of the workpiece 275 comes into contact with the complete tracing assembly 5. A side view of this point of contact is shown in FIG. 8, and a perspective view in FIG. 11.

As the workpiece 275 makes contact with the upright member 185 of the complete tracing assembly 5, the cutter 145, which is aligned to the upright member 185 of the complete tracing assembly 5, cuts through and trims the part of the edgeband 280 on the workpiece 275, extending beyond its front face 277 (see FIG. 11). With further forward movement, the workpiece 275 simultaneously exerts pressure on the complete tracing assembly 5, which, attached to the tracing assembly support 10, gradually rises angularly by sliding upward on bars 60 and 70 (see FIG. 15). The upward movement simultaneously raises the tracer 5 and the cutter 145, the cutter 145 trimming more of the edgeband 280 extending past the front of the workpiece (see FIG. 9 and FIG. 12).

As the operator or some mechanism continues to apply force, the tracer subassembly 150 continues to travel up the front face 277 of the workpiece 275 until it reaches the corner 279 between top surface 276 and front face 277 of the workpiece 275, (see FIG. 13). With additional forward motion, the roller 155 (not shown) rides over the corner 279 between top surface 276 and front face 277 of the workpiece 275 until tracer subassembly 150 comes to rest on the top surface 276 of the workpiece 275 (see FIGS. 10 and 14). The operator or some mechanism can continue to apply forward force, moving the workpiece 275 across the horizontal table 20, in turn trimming the edgeband 280 extending past the top surface 276 of the workpiece 275. After the rear end 278 of the workpiece 275 travels through the cutter 145, the tracing assembly support 10, by force of gravity, slides toward the bottom of parallel bar support 80 to point 112, and the invention 1 is ready to begin the edgeband trimming operation again.

The workpiece 275 is turned over and the process repeated if the edgeband 280 to be trimmed also extends past the bottom edge and the rear edge of the workpiece 275. The workpiece 275 illustrated in FIG. 4 prior to trimming becomes the workpiece in FIG. 5 after the process is completed the edgeband 280 is flush with all surfaces of the of the workpiece 275.

Figure 16:
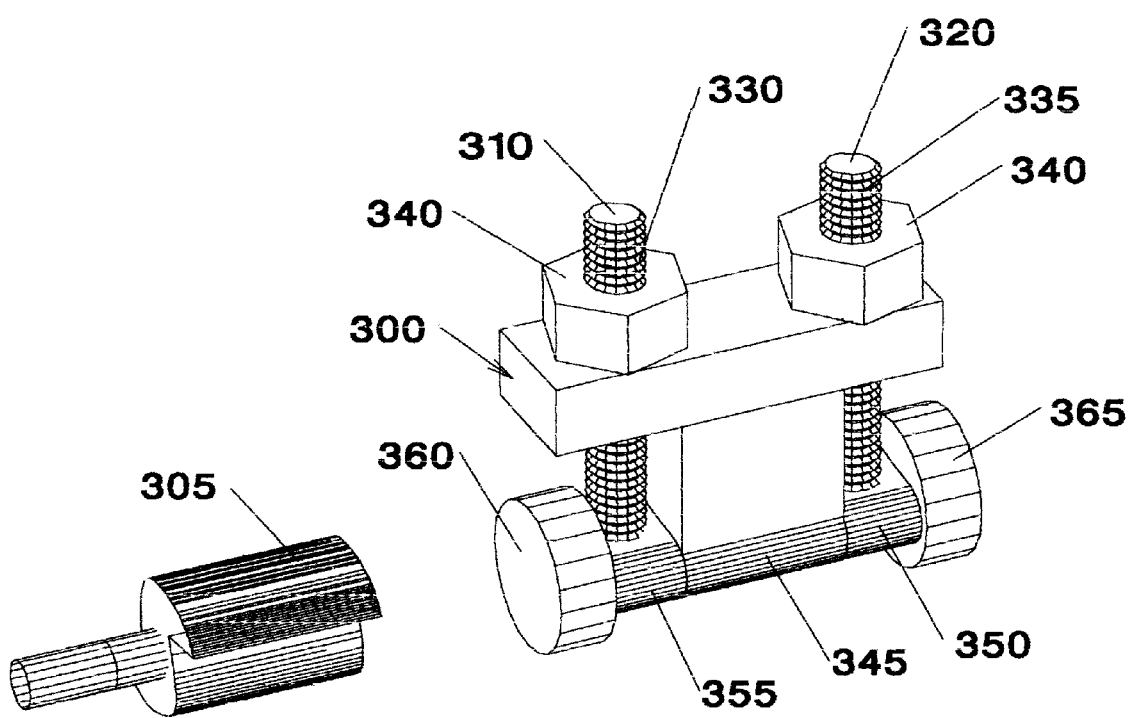
FIG. 16 shows a perspective view of an alternative embodiment of the tracer assembly.

An alternate embodiment of the present invention 1 is shown in FIG. 16, where the invention is substantially the same as the preferred embodiment, except that the tracing assembly consists of a cube 345 attached to assembly support 300, in turn connected to the plate 55, as shown in FIG. 1. Disposed on either side of the cube 345 are movable links 350 and 355. Attached to the movable links 350 and 355 are rollers 360 and 365. Rods 310 and 320 having threads 330 and 335 extend through the assembly support 300 so that when the distance between the links 350 and 355 and the assembly support 300 is increased or decreased by turning rods 310 and 320, the rollers 360 and 365 are raised or lowered, adjusting the cutting depth of the cutter 305. Locknuts 340 lock rods 310 and 320 in place.

Figure 17:
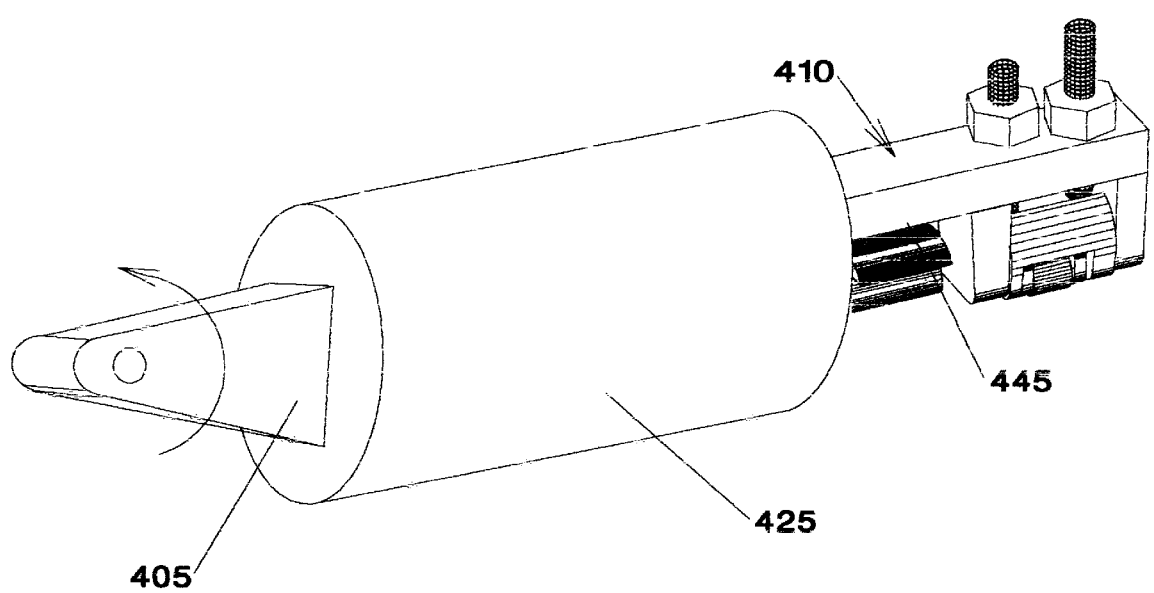
FIG. 17 shows a perspective view of another alternative embodiment of the tracer assembly.

Another alternate embodiment shown in FIG. 17 is constructed substantially as the preferred embodiment, except that the cutter rotation assembly 425 is not attached to plate 55 (shown in FIG. 1). Instead, as shown in FIG. 17, bar 405 is attached to a stationary support (not shown) which allows tracing assembly 410 to move up and down through an arc which allows the cutter 445 to cut the front face of the workpiece and then the top surface of the workpiece as the workpiece is moved under the cutter 445.

Figure 19:
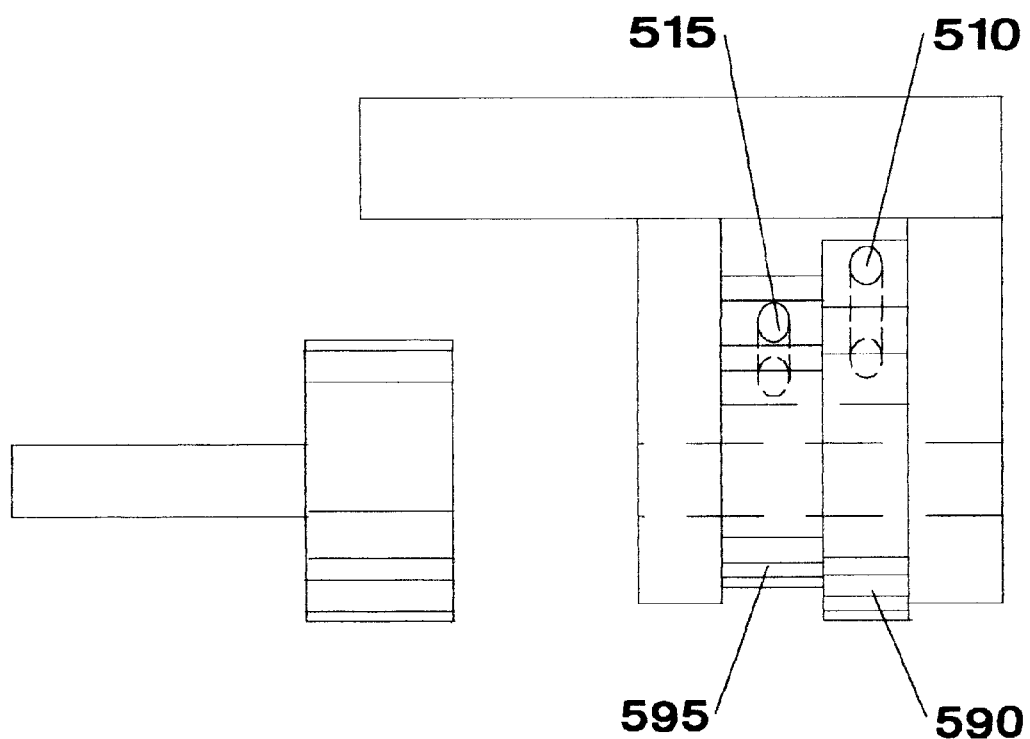
FIG. 19 shows a front view of an alternative embodiment of the tracer assembly.

In another alternate embodiment as shown in FIG. 19, the invention is substantially the same as that shown in the preferred embodiment, except that the upright and horizontal members of the tracing assembly are replaced with upright cam 595 and horizontal cam 590. The cams 595 and 590, like the upright and horizontal members of the preferred embodiment are adjustable via adjusting rods 510 and 515.

Figure 20:
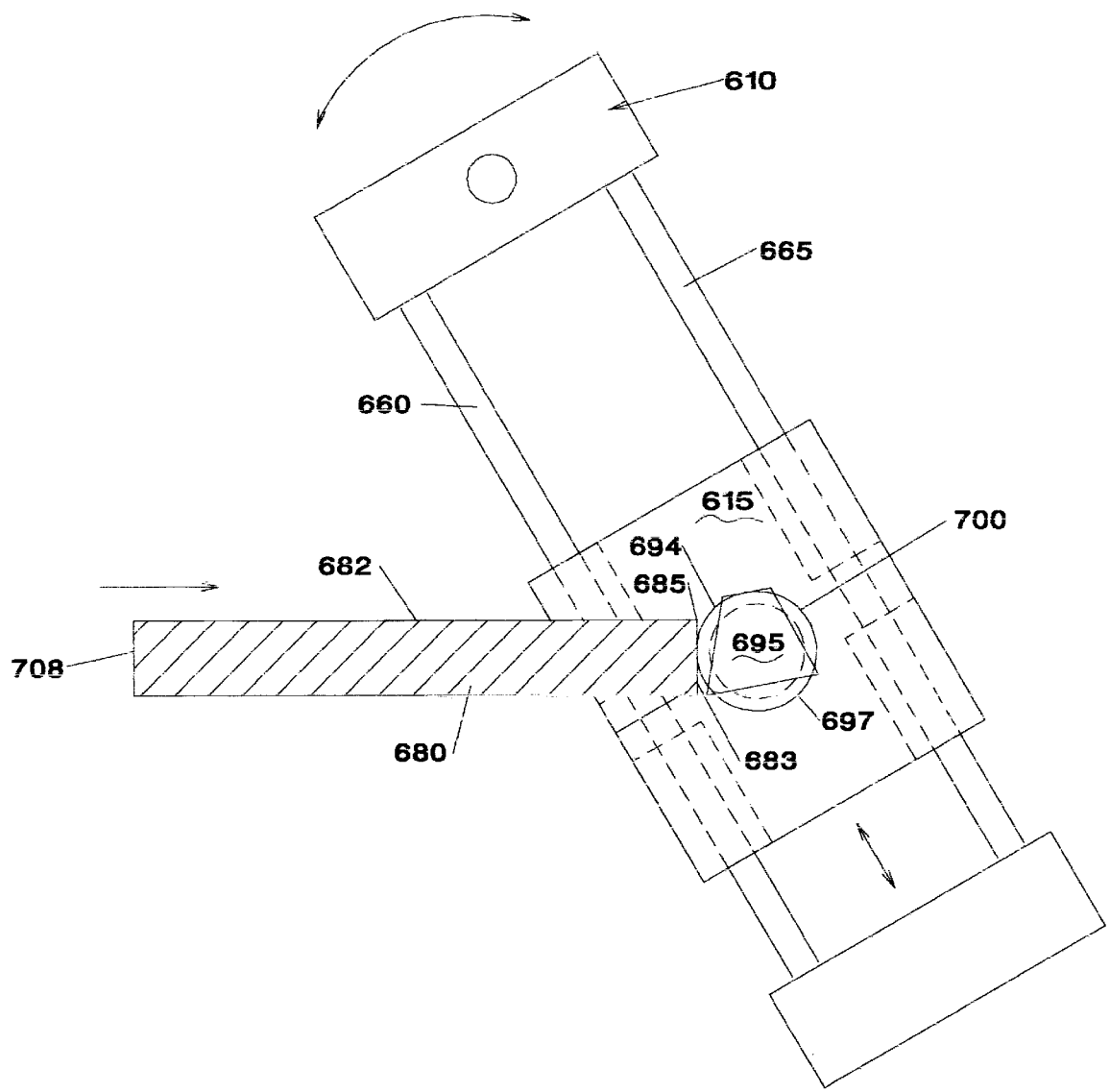
FIG. 20 shows a side view of an alternative embodiment of the invention.

In another alternate embodiment as shown in FIG. 20, the invention is substantially the same as that shown in the preferred embodiment, except that plate 615 is moved via an expanding assembly (not shown) up bars 660 and 665. When the front surface 683 of workpiece 680 makes contact with front tracer surface 694 of tracer 695, plate 615 moves via an expanding assembly (not shown) upward until it reaches edge 685 of workpiece 680. Sliding support 610 then rotates so bottom surface 697 of tracer 695 is parallel to the top surface 682 of workpiece 680. The operator or some mechanism continues to exert force on workpiece 680 and bottom tracer surface 697 of tracer 695 glides along the top surface 682 of workpiece 680, trimming the edgeband flush with the edge of the workpiece 680. Sliding support 610 then rotates so back tracer surface 700 of tracer 695 is parallel to the rear surface 708 of the work piece 680. Then plate 615 slides down bars 660 and 665 with tracer 695 determining the depth of cut of the rotating cutter (not shown) on the rear surface of the edgeband (not shown). Front tracer surface 694, bottom tracer surface 697 and back tracer surface 700 are adjustable with extendable rods (not shown).

The foregoing specification describes only the preferred embodiment and several alternate embodiments of the invention as shown. Other embodiments besides may be articulated as well. The terms and expressions therefore serve only to describe the invention by example only and not to limit the invention. It is expected that others will perceive differences which while differing from the foregoing, do not depart from the spirit and scope of the invention herein-described and claimed.

What I claim:

1. A device for trimming excess material applied to a workpiece, comprising:
   horizontal planar surface for supporting a workpiece, said horizontal planar surface having front and back ends;
   vertical support means supported by said horizontal planar surface, said vertical support means having a tracing assembly support means disposed thereon; and
   means for cutting the excess material applied to a workpiece, said cutting means supported and guided by a tracing assembly means which traces a surface of the workpiece as the workpiece is moved from said front end toward said back end of said horizontal planar surface.

2. The device in claim 1, wherein said tracing assembly support means has a plate.

3. The device in claim 2, wherein said plate has a sliding support means movably connected to said plate.

4. The device in claim 3, wherein said plate has a cutter rotation means connected to said plate, with said cutting means connected to said cutter rotation means.

5. The device in claim 1, wherein said cutting means is aligned with said tracing assembly means.

6. The device in claim 4, wherein said cutting means is aligned with said tracing assembly means.

7. The device in claim 1, wherein said tracing assembly means consists of a means for tracing a workpiece, a roller disposed within said tracing means, and a means for adjusting the tracing means so that it is aligned with said cutting means.

8. The device in claim 1, wherein said horizontal planar surface has a tracing assembly cavity complimentarily sized to accommodate said tracing assembly means.

9. The device in claim 3, wherein said sliding support means consists of at least one bar, movably connected to said plate by means of at least one plate support means, said bar securely connected to said vertical support means by at least one bar support means.

10. The device in claim 1, wherein said horizontal planar surface has a side in proximity to said cutting means, and disposed on said side a trough extending from said front end to said back end of said horizontal table.

11. The device in claim 10, wherein a shoulder is disposed on said trough.

12. The device of claim 7, wherein said tracing assembly means has an assembly support means having at least one sidewall extending perpendicularly from said assembly support means, said sidewall sized to accommodate said tracing means and said roller.

13. A device for trimming excess material applied to a workpiece, comprising:
   horizontal planar surface for supporting a workpiece, said horizontal planar surface having first and second sides, with front and back ends;
   vertical support means perpendicular to and disposed on said first side of said horizontal planar surface, said vertical support means having a tracing assembly support means disposed thereon, said tracing assembly support means having a plate, a sliding support means movably connected to said plate, and a cutter rotation means also connected to said plate; and
   means for cutting the excess material disposed on a workpiece, said cutting means disposed on said cutter rotation means and guided and supported by a tracing assembly means which traces a surface of the workpiece as said workpiece is moved from said front end to said back end of said horizontal planar surface.

14. The device in claim 13, wherein said cutting means is aligned with said tracing assembly means.

15. The device in claim 13, wherein said tracing assembly means has a tracing means, a roller and a tracing adjustment means.

16. The device in claim 13, wherein said horizontal planar surface has a tracing assembly cavity disposed on said first side, said cavity complimentarily sized to accommodate said tracing assembly means.

17. The device in claim 13, wherein said sliding support means consists of at least one bar, movably connected to said plate by means of at least one plate support means, said bar securely connected to said vertical support means by at least one bar support means.

18. The device in claim 13, wherein said horizontal planar surface has on said first side a trough extending said length of said horizontal table, said trough so disposed on said horizontal planar surface that it is aligned directly under said cutting means.

19. The device in claim 18, wherein a shoulder is disposed on said trough.

20. The device in claim 15, wherein said tracing assembly means has an assembly support means having at least one sidewall extending perpendicularly from said assembly support means, said sidewall sized to accommodate said tracing means and said roller.

21. A device for trimming excess material applied to a workpiece, comprising:

horizontal planar surface, having front and back ends, said horizontal planar surface further having a tracing assembly cavity;

vertical support means in proximity and perpendicular to said horizontal planar surface, having disposed thereon a tracing assembly support means, said tracing assembly support means having disposed thereon a plate, a sliding support means movably connected to said plate, a cutter rotating means disposed on said plate, a cutting means connected to said cutter rotating means, the cutting means aligned with a tracing assembly means sized to fit within said tracing assembly cavity, said tracing assembly means having a means for tracing which traces a surface of the workpiece, a roller, and a means for adjusting the tracing means so that it is aligned with said cutting means.

* * * * *